US012655914B2

(12) United States Patent
Sawardekar et al.

(10) Patent No.: US 12,655,914 B2
(45) Date of Patent: Jun. 16, 2026

(54) CYLINDRICAL VALVE SLIDER SEAL WITH RAISED CONTACT RIBS

(71) Applicant: Vitesco Technologies USA, LLC, Auburn Hills, MI (US)

(72) Inventors: Shrutika Sawardekar, Windsor (CA); Alexander Dragojlov, Chatham (CA); Ravinder Singh Gill, Chatham (CA); Benjamin Dominick Manton Williams, Chatham (CA); Jianlin Guo, Calgary (CA)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 337 days.

(21) Appl. No.: 18/406,126

(22) Filed: Jan. 6, 2024

(65) Prior Publication Data

US 2025/0060042 A1 Feb. 20, 2025

Related U.S. Application Data

(60) Provisional application No. 63/520,354, filed on Aug. 18, 2023.

(51) Int. Cl.
F16K 11/085 (2006.01)
F16K 25/00 (2006.01)

(52) U.S. Cl.
CPC .......... F16K 11/0856 (2013.01); F16K 25/00 (2013.01)

(58) Field of Classification Search
CPC ........ F16J 15/16; F16J 15/328; F16J 15/3284; F16J 15/54; F16K 11/0856; F16K 25/00
See application file for complete search history.

(56) References Cited

U.S. PATENT DOCUMENTS 3,072,379 A * 1/1963 Hamer .................. F16K 5/0471
137/246.22
2024/0301958 A1* 9/2024 Yan ...................... F16K 11/0853

FOREIGN PATENT DOCUMENTS

| | | | | |
|---|---|---|---|---|
| CN | 117588581 A | * | 2/2024 | .......... F16K 11/0853 |
| DE | 102023201155 A1 | * | 8/2024 | .......... F16K 11/0853 |
| JP | 2024117989 A | * | 8/2024 | .......... F16K 11/0853 |
| WO | WO-2023172901 A1 | * | 9/2023 | ............ F16K 11/085 |

* cited by examiner

*Primary Examiner* — Gilbert Y Lee

(57) ABSTRACT

A seal assembly which includes a combination of an outer sleeve and an inner sleeve, which has a low friction sliding interface, such that the seal assembly provides desired sealing force and frictional force characteristics. When assembled, the seal assembly surrounds a rotor, such that the seal assembly is disposed between the outer surface of the rotor and the inner surface of a housing. The inner sleeve includes one or more ribs which are in contact with the outer surface of the rotor, which concentrates the sealing in the area of the ribs. The concentration of the sealing reduces the total friction between the rotor and the inner sleeve, while maintaining proper sealing force. The ribs formed as part of the inner sleeve are spaced apart such that the openings of the rotor are positioned relative to the ribs in a desired manner, regardless of the orientation of the rotor.

23 Claims, 6 Drawing Sheets

CYLINDRICAL VALVE SLIDER SEAL WITH RAISED CONTACT RIBS

CROSS-REFERENCE TO RELATED APPLICATIONS

This application claims the benefit of provisional application 63/520,354, filed Aug. 18, 2023. The disclosure of the above application is incorporated herein by reference.

FIELD OF THE INVENTION

The invention relates generally to a seal assembly for multi-port coolant flow control valve which includes a seal element having at least one sleeve, and the inner surface of the sleeve includes one or more ribs, where the sleeve is located inside the cavity of a housing such that the seal element is located and compressed between an inner surface of the housing and a rotor, such that the ribs apply force to an outer surface of a rotor to achieve the desired sealing when the rotor is placed in one of a plurality of orientations.

BACKGROUND OF THE INVENTION

Multi-port valves for directing fluid through various conduits are generally known. Some of the more common types of valves are a three-port valve and a four-port valve, where a single valve member is used to direct fluid from an inlet port to one of several outlet ports. Some multi-port valves include a five-port orientation, where multiple actuators are used to change the orientation of the valve to direct the flow of fluid as desired. There are also manifold style valves having up to eight ports are available but offer very little flexibility to accommodate different flow modes and different flow paths.

These current designs also have limitations with regard to sealing flexibility, which results in limitations for flow path design and efficiency.

Accordingly, there exists a need for a multi-port valve assembly which includes sealing to provide for efficiency that facilitates desired flow paths, and minimizes leakage.

SUMMARY OF THE INVENTION

In an embodiment, the present invention is a seal assembly which includes a combination of an outer sleeve, such as elastomer energizer, and an inner sleeve, which has a low friction sliding interface, such that the seal assembly provides desired sealing force and frictional force characteristics. The seal assembly may be one more pieces, which when assembled, is conical shaped and surrounds a rotor, such that the seal assembly is disposed between the outer surface of the rotor and the inner surface of a housing. In an embodiment, the inner sleeve includes one or more ribs which are in contact with the outer surface of the rotor, which concentrates the sealing in the area of the ribs. The concentration of the sealing reduces the total friction between the rotor and the inner sleeve, while maintaining proper sealing force. The ribs formed as part of the inner sleeve are spaced apart such that the openings of the slider are positioned relative to the ribs in a desired manner, regardless of the orientation of the slider during operation.

In an embodiment, the present invention is a seal assembly for a multi-port valve assembly, the seal assembly having a seal element. In an embodiment, the seal element includes an inner sleeve, an outer sleeve connected to the inner sleeve, and a plurality of apertures extending through the inner sleeve and the outer sleeve.

In an embodiment, a plurality of vertical ribs is integrally formed as part an inner surface of the inner sleeve such that at least one of the plurality of vertical ribs is located between two of the plurality of apertures, and a plurality of horizontal ribs is integrally formed as part an inner surface of the inner sleeve such that each of the plurality of horizontal ribs is in continuous contact with the outer surface of a rotor.

In an embodiment, a plurality of support ribs is integrally formed as part an inner surface of the outer sleeve, each of the plurality of support ribs are in contact with and support a corresponding one of the plurality of vertical ribs or one of the plurality of horizontal ribs. At least one of the plurality of vertical ribs and at least one of the plurality of horizontal ribs are in contact with the outer surface of the rotor.

In an embodiment, a plurality of outer ribs integrally formed as part of an outer surface of the outer sleeve, and each of the plurality of outer ribs is in contact with an inner surface of a housing.

In an embodiment, each of the plurality of support ribs is supported by a corresponding one of the plurality of outer ribs.

In an embodiment, the seal element includes a first plane extending through the seal element, a first level on one side of the first plane, and a second level on the opposite side of the first plane in relation to the first level. A second plane extends through the seal element, the second level is disposed between the first plane and the second plane, and a third level on the on the opposite side of the second plane in relation to the second level. A portion of the vertical ribs is integrally formed as a part of the seal element which is located on the first level, another portion of the vertical ribs is integrally formed as a part of the seal element which is located on the second level, and another portion of the vertical ribs is integrally formed as a part of the seal element which is located on the first level.

In an embodiment, one portion of the plurality of horizontal ribs is located in the first plane, and another portion of the plurality of horizontal ribs is located in the second plane.

In an embodiment, a first of the plurality of vertical ribs is disposed between two of the plurality of apertures, a second of the plurality of vertical ribs is disposed between two of the plurality of apertures, and at first circumferential spacing is between the first of the plurality of vertical ribs and the second of the plurality of vertical ribs.

In an embodiment, a third of the plurality of vertical ribs is disposed between two of the plurality of apertures. A second circumferential spacing is between the second of the plurality of vertical ribs and the third of the plurality of vertical ribs. In an embodiment, the first circumferential spacing decreases along the length of the first of the plurality of vertical ribs and the second of the plurality of vertical ribs, and the second circumferential spacing decreases along the length of the second of the plurality of vertical ribs and the third of the plurality of vertical ribs.

In an embodiment, a plurality of arcuate rib features is integrally formed as part of the inner surface of the inner sleeve, such that each of the arcuate rib features is integrally formed with one of the plurality of vertical ribs and one of the plurality of horizontal ribs.

In an embodiment, each of the plurality of arcuate rib features includes at least one rib portion. One end of the rib portion is integrally formed with at least one of the plurality of vertical ribs, and another end of the rib portion is integrally formed with at least one of the plurality of horizontal ribs.

In an embodiment, each of the plurality of horizontal ribs includes a curved surface having a radius, and at least a portion of the curved surface is in contact with the outer surface of the rotor.

In an embodiment, each of the plurality of vertical ribs includes a curved surface having a radius, and at least a portion of the curved surface is in contact with the outer surface of the rotor.

In an embodiment, the rotor is positioned in one or more of a plurality of orientations, and one or more of the vertical ribs is in contact with the outer surface of the rotor when the rotor is placed in each of the plurality of orientations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
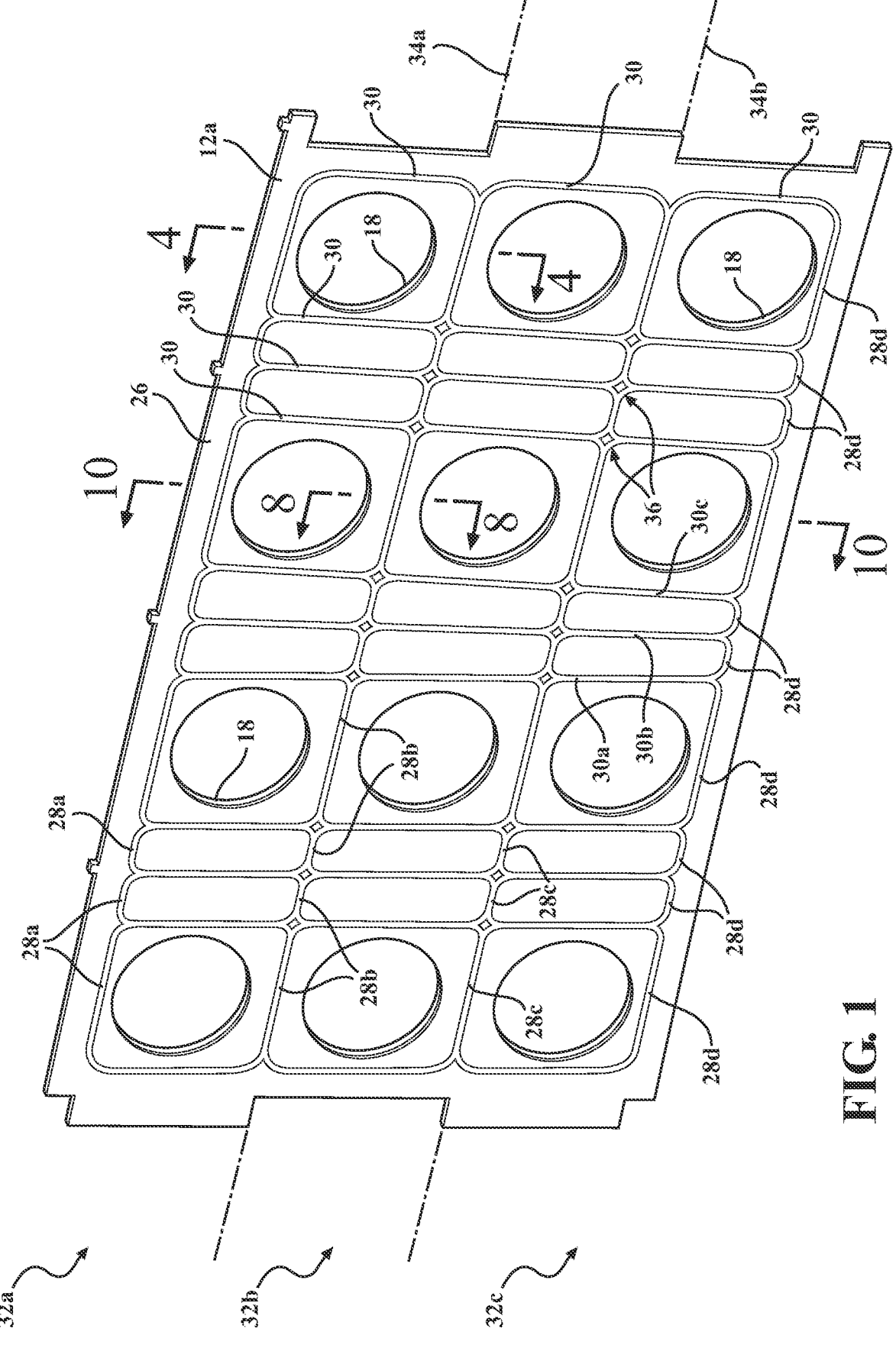
FIG. 1 a perspective view of a seal element which is part of a seal assembly, according to embodiments of the present invention.
Figure 2B:
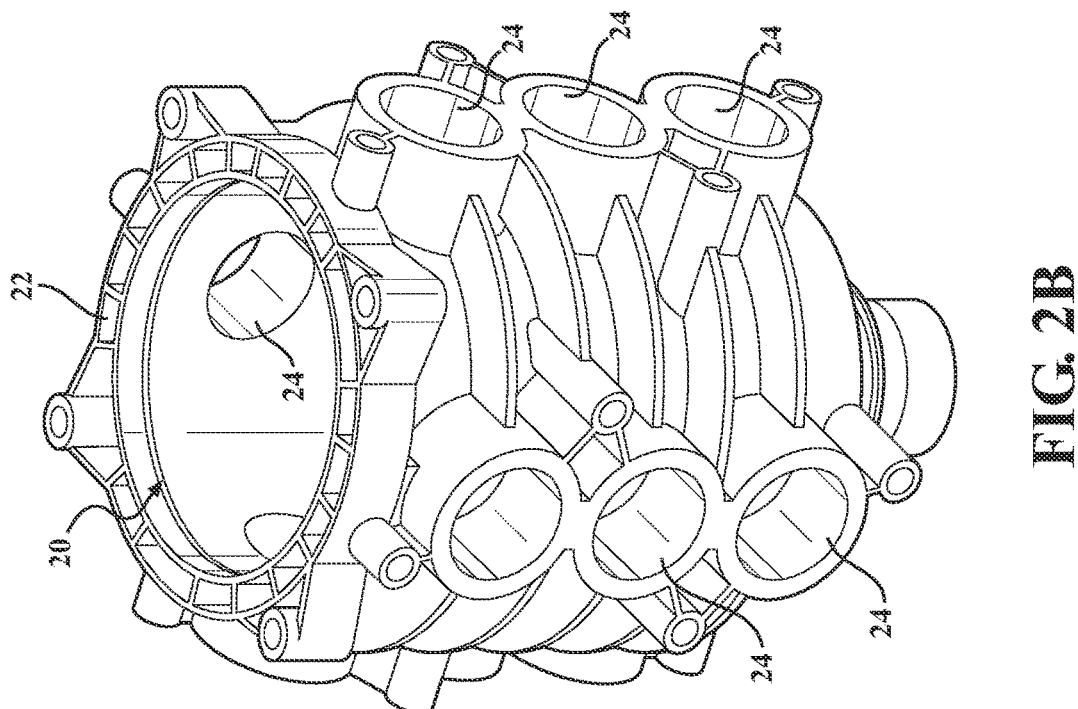
FIG. 2B is a perspective view of a housing which is part of a multi-port valve having a seal assembly, according to embodiments of the present invention.
Figure 2A:
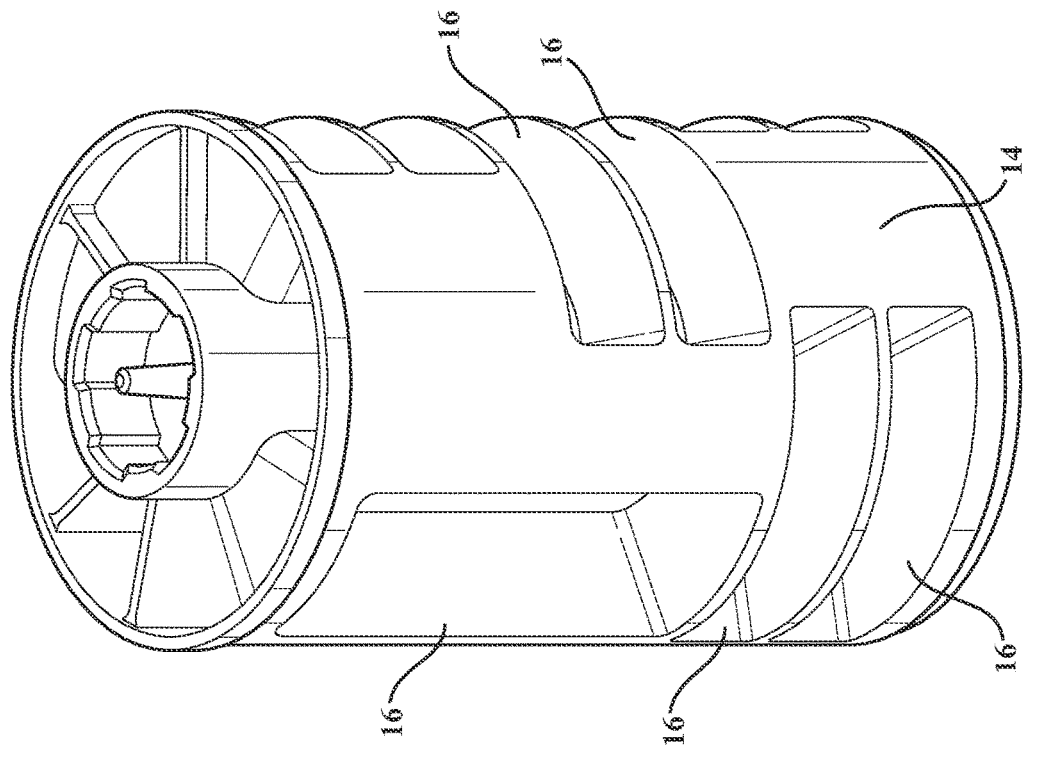
FIG. 2A is a perspective view of a rotor which is part of a multi-port valve having a seal assembly, according to embodiments of the present invention.
Figure 3:
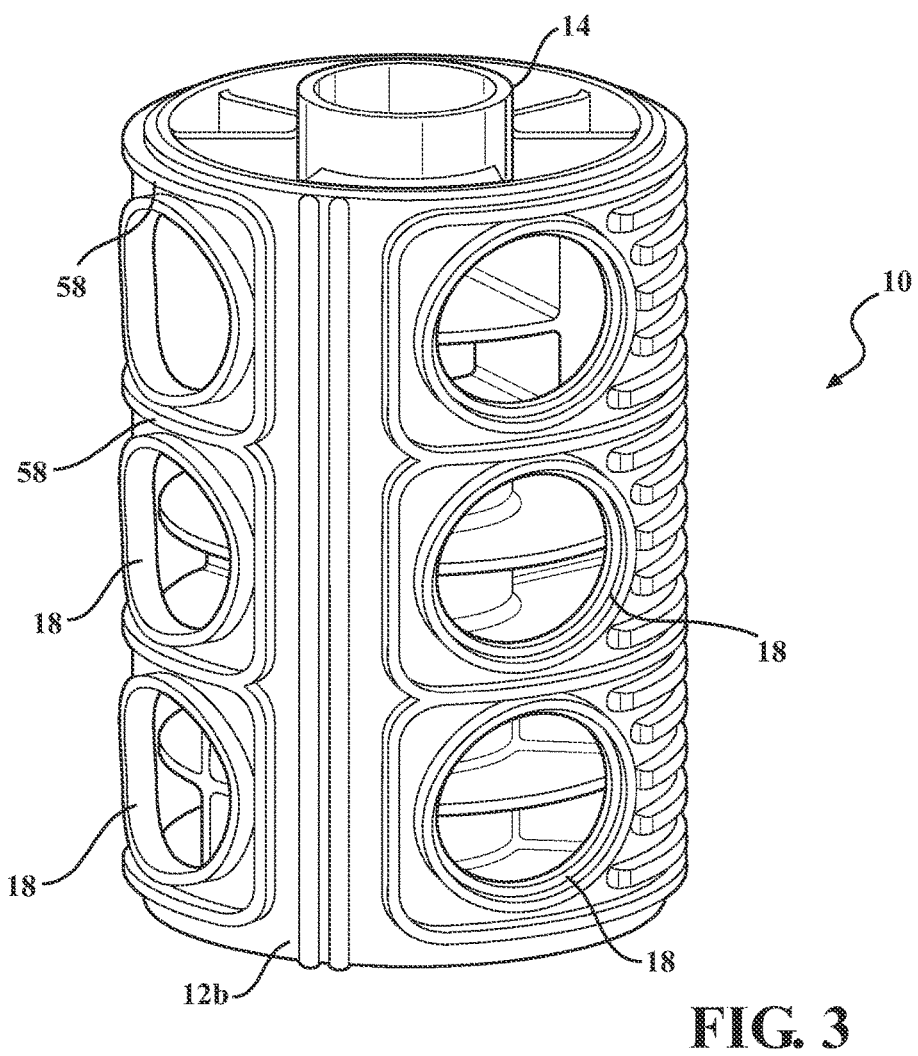
FIG. 3 is a perspective view of a seal element surrounding a rotor, which is part of a seal assembly, according to embodiments of the present invention.

A seal element which is part of a seal assembly according to the present invention is shown in the Figures, generally at 10. The seal element 10 includes an inner sleeve 12a and an outer sleeve 12b. In FIG. 1, the seal element 10 is shown in an unassembled view, where the seal element 10 is flat. However, as shown in FIG. 3, when assembled, the seal element 10 is substantially cone-shaped, and surrounds a rotor 14 having various channels 16 which distribute fluid through various apertures, shown generally at 18, of the inner sleeve 12a and outer sleeve 12b. Referring to FIGS. 2A-3, the seal element 10 is disposed in a cavity, shown generally at 20, of a housing 22, and the seal element 10 surrounds the rotor 14. The housing 22 also includes several ports 24, where each of the ports 24 is substantially aligned and in fluid communication with a corresponding one of the apertures 18. The seal element 10 and the rotor 14 are disposed in the housing 22 such that there is an interference fit, where the seal element 10 is compressed between the rotor 14 and the housing 22.

Figure 4:
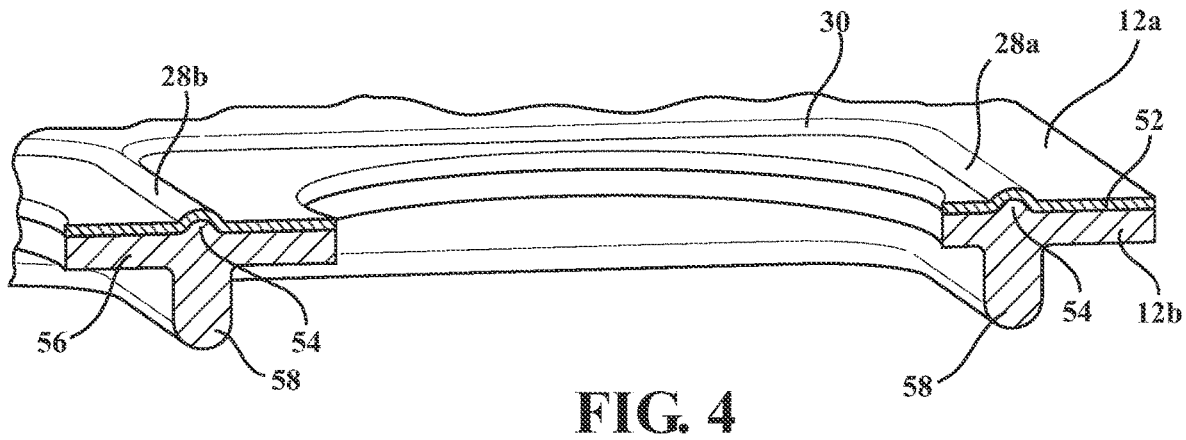
FIG. 4 is a sectional view taken along lines 2-2 of FIG. 1.

Referring to FIGS. 1 and 3-4, integrally formed as part of an inner surface 26 of the inner sleeve 12a is a first plurality of ribs. More specifically, there are various horizontal ribs 28a, 28b, 28c, 28d and vertical ribs 30 integrally formed on the inner surface 26 of the inner sleeve 12a. Several of the ribs 28a, 28b, 28c, 28d, 30 are adjacent the apertures 18. More specifically, there are at least three vertical ribs 30 in between each of the apertures 18, and one horizontal rib 28a, 28b, 28c, 28d in between each aperture 18, as shown in FIG. 1. A portion of the apertures 18 and ribs 28a, 30 are located on a first level, shown generally at 32a, another portion of the apertures 18 and ribs 30 are located on a second level, shown generally at 32b, and another portion of the apertures 18 and ribs 28d, 30 are located on a third level, shown generally at 32c. The first level 32a and the second level 32b are separated by a first plane 34a, and the second level 32b and the third level 32c are separated by a second plane 34b. A portion of the horizontal ribs 28b are in substantial alignment with the first plane 34a, and another portion of the horizontal ribs 28c are in alignment with the second plane 34b.

Also integrally formed as part of the inner surface 26 of the inner sleeve 12a is a plurality of arcuate rib features, shown generally at 36. Each of the plurality of arcuate rib features 36 is integrally formed with at least one of the horizontal ribs 28a, 28b, 28c, 28d and one of the vertical ribs 30.

Figure 5:
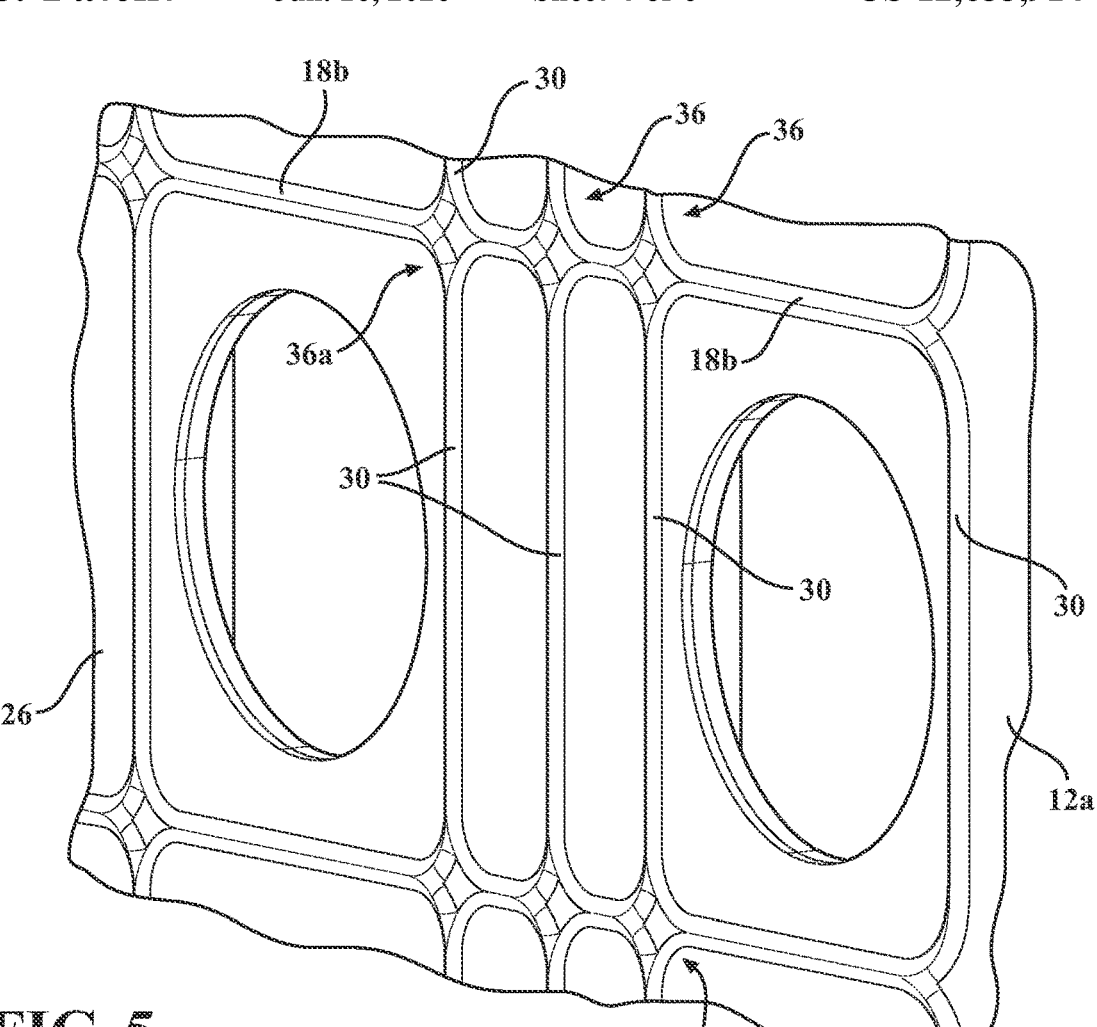
FIG. 5 is a perspective view of a portion of a seal element which is part of a seal assembly, according to embodiments of the present invention.
Figure 6:
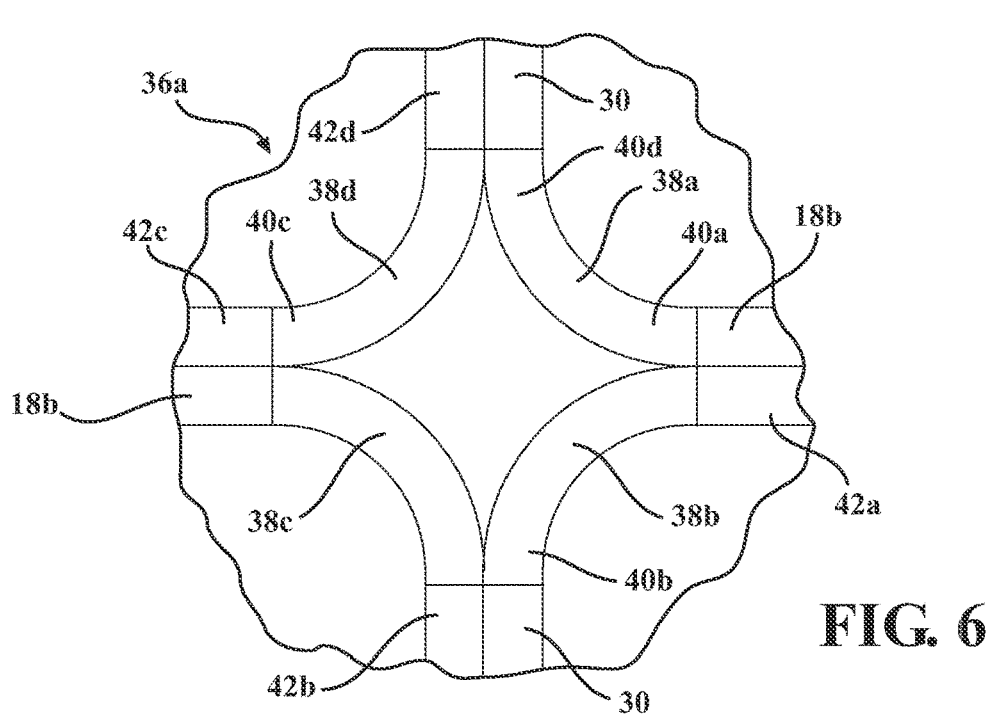
FIG. 6 is an enlarged view of an arcuate rib feature which is part of a seal element of a seal assembly, according to embodiments of the present invention.

Each of the arcuate rib features 36 is of similar construction, therefore only one is described. Referring to FIGS. 5-6, the arcuate rib feature 36a includes four rib portions 38a, 38b, 38c, 38d, which in this embodiment are curved, and the rib portions 38a, 38b, 38c, 38d are integrally formed together such that the arcuate rib feature 36a has end portions 40a, 40b, 40c, 40d, where the first end portion 40a is integrally formed with an end 42a one of the horizontal ribs 18b, the second end portion 40b is integrally formed with and end 42b one of the vertical ribs 30, the third end portion 40c is integrally formed with an end 42c another of the horizontal ribs 18b, and the fourth end portion 40d is integrally formed with and end 42d another of the vertical ribs 30.

Figure 7:
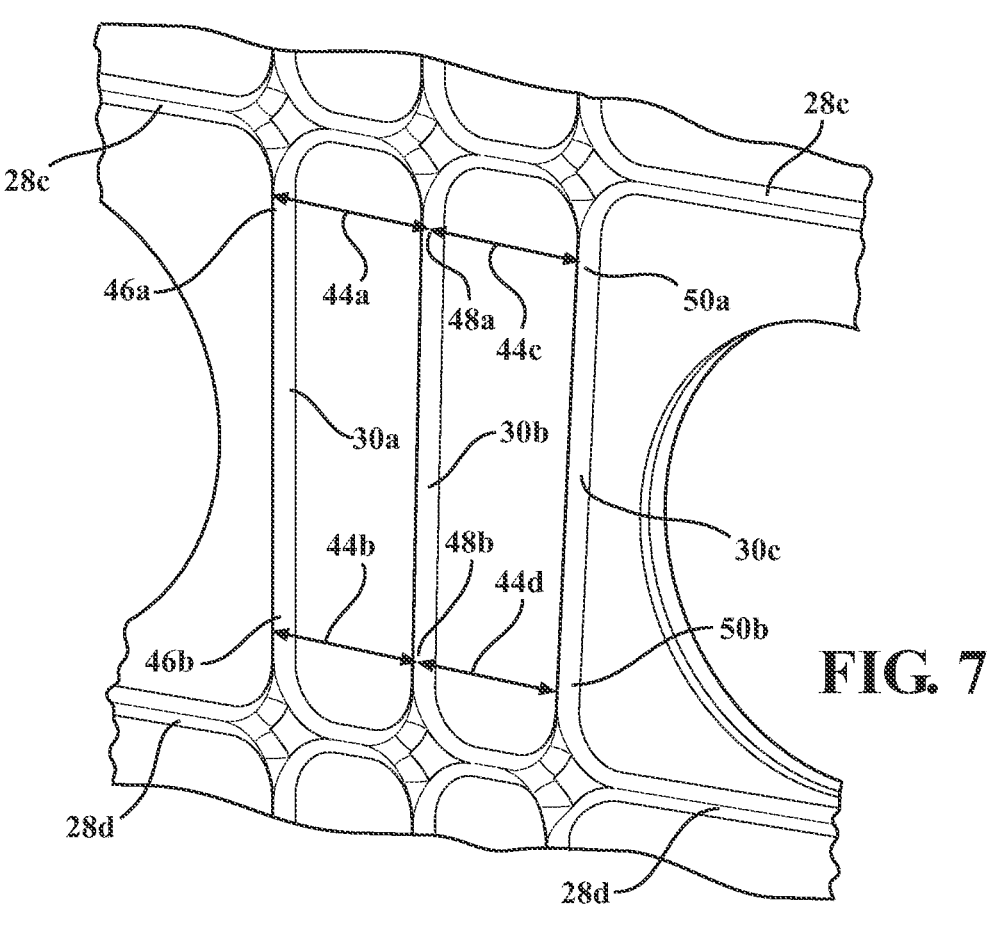
FIG. 7 is an enlarged view of a several vertical ribs which is part of a seal element of a seal assembly, according to embodiments of the present invention.
Figure 8:
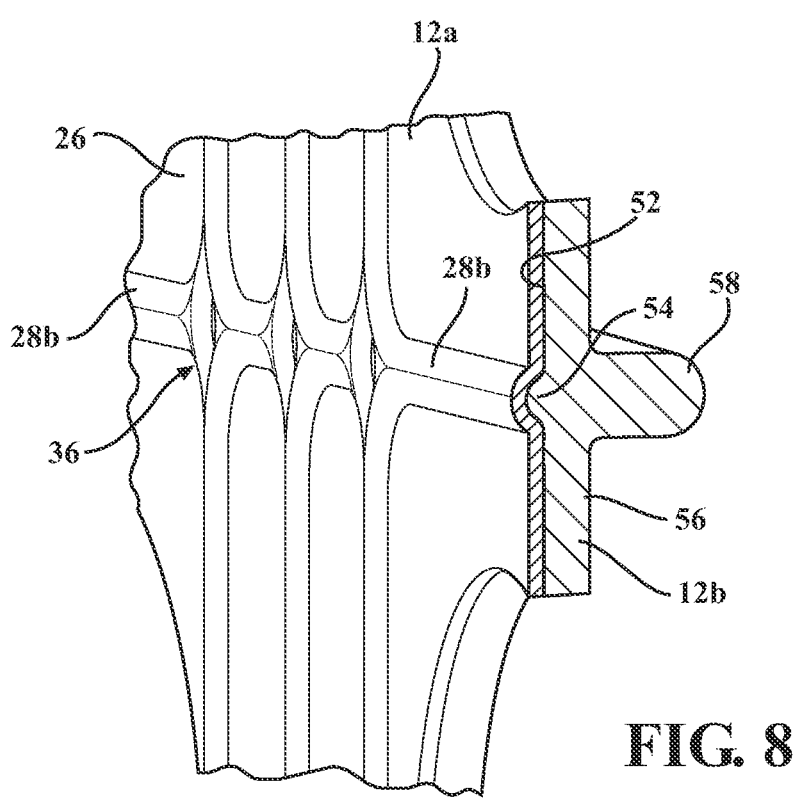
FIG. 8 is a sectional view taken along lines 8-8 of FIG. 1.

For the seal element 10 to achieve the desired cone shape when assembled, the shape of the inner sleeve 12a and the outer sleeve 12b is such that the length and spacing of several of the ribs 28a, 28b, 28c, 28d, 30 (located toward the center of the seal element 10 when looking at FIG. 1) varies along the length and height of the seal element 10. Referring to FIGS. 1 and 7, in a non-limiting example, there is a first circumferential spacing 44a between a first end 46a of the vertical rib 30a and a first end 48a of the vertical rib 30b located on the third level 32c. There is also a second circumferential spacing 44b between a second end 46b of the vertical rib 30a and a second end 48b of the vertical rib 30b located on the third level 32c. Because of the cone-shape of the seal element 10, the ribs 30*a*, 30*b* are not parallel to one another such that the first circumferential spacing 44*a* between the vertical ribs 30*a*, 30*b* is larger than the second circumferential spacing 44*b*, and the circumferential spacing between the vertical ribs 30*a*, 30*b* gradually decreases from the first circumferential spacing 44*a* to the second circumferential spacing 44*b*. The remaining vertical ribs 30 (located toward the center of the seal element 10 when looking at FIG. 1) in the first level 32*a*, the second level 32*b*, and the third level 32*c* are similar, and have a circumferential spacing relative to one another which decreases from the horizontal ribs 28*a* of the seal element 10 to the horizontal ribs 28*d* of the seal element 10. In this embodiment, the remaining vertical ribs 30 are substantially parallel to each other. However, it is within the scope of the invention that the inner sleeve 12*a* and the outer sleeve 12*b* may be shaped to achieve the cone shape when the seal element 10 is assembled, such that the other vertical ribs 30 are not parallel to each other, having varied circumferential spacing as described above.

Furthermore, although there are different circumferential spacings 44*a*, 44*b* shown which have different angular distances, the angular distance of the circumferential spacings 44*a*, 44*b* is the same when the seal element 10 is assembled. In this embodiment, the angular distance of the circumferential spacings 44*a*, 44*b* is 22.5 degrees. Referring to FIG. 7, there is also additional circumferential spacings 44*c*, 44*d* extending between the center of each of the two vertical ribs 30*b*, 30*c*. More specifically, in another non-limiting example, there is a third circumferential spacing 44*c* between the first end 48*a* of the vertical rib 30*b* and a first end 50*a* of the vertical rib 30*c* located on the third level 32*c*. There is also a fourth circumferential spacing 44*d* between a second end 48*b* of the vertical rib 30*b* and a second end 50*b* of the vertical rib 30*c* located on the third level 32*c*. The angular distance of the circumferential spacings 44*c*, 44*d* is also 22.5 degrees. Therefore, the combined angular distance of the circumferential spacings 44*a*, 44*c* is 45 degrees, and the combined angular distance of the circumferential spacings 44*b*, 44*d* is also 45 degrees.

The circumferential spacings 44*a*, 44*b*, 44*c*, 44*d* between the vertical ribs 30*a*, 30*b*, 30*c* described above and the circumferential spacings between the other vertical ribs 30 is such that there is always at least one of the vertical ribs 30, 30*a*, 30*b*, 30*c* in contact with the rotor 14 in each of the levels 32*a*, 32*b*, 32*c*. During operation, the rotor 14 may be rotated to one or more various orientations, and the spacing and location of the ribs 30, 30*a*, 30*b*, 30*c* is such that when the rotor 14 is placed in each of the orientations, at least one of the vertical ribs 30, 30*a*, 30*b*, 30*c* is in contact with the rotor 14. At least one of the vertical ribs 30, 30*a*, 30*b*, 30*c* being in contact with the outer surface of the rotor 14 minimizes or prevents undesired flow of fluid between the various apertures 18 and the ports 24, such that desired flow paths between the channels 16 of the rotor 14 and the various ports 24 are achieved. The various circumferential spacings used may be changed to accommodate the shape of the channels of the rotor 14. It is within the scope of the invention that any circumferential spacing and angular distance between the vertical ribs 30, 30*a*, 30*b*, 30*c* may be used to accommodate different seal designs and shapes, and rotors having channels with various shapes and configurations.

Referring to FIGS. 4 and 8-10, integrally formed with an inner surface 52 of the outer sleeve 12*b* is a plurality of support ribs 54, where the plurality of support ribs 54 includes both horizontal support ribs and vertical support ribs. The pattern of the support ribs 54 on the inner surface 52 of the outer 12*b* sleeve corresponds to the pattern of the ribs 28*a*, 28*b*, 28*c*, 28*d*, 30, 30*a*, 30*b*, 30*c* of the inner sleeve 12*a*, such that the support ribs 54 are aligned with and provide support and rigidity to the ribs 28*a*, 28*b*, 28*c*, 28*d*, 30, 30*a*, 30*b*, 30*c* when the seal element 10 is compressed between the outer surface of the rotor 14 and the inner surface of the cavity 20 of the housing 22.

With continued reference to FIGS. 4 and 8-10, integrally formed with the outer surface 56 of the outer sleeve 12*b* is a plurality of outer ribs 58. The pattern of the outer ribs 58 of the outer sleeve 12*b* is such that each one of the ribs 28*a*, 28*b*, 28*c*, 28*d*, 30, 30*a*, 30*b*, 30*c* and support ribs 54 of the inner sleeve 12*a* is in alignment with and supported by at least one of the outer ribs 58, and the orientation of the ribs 28*a*, 28*b*, 28*c*, 28*d*, 30, 30*a*, 30*b*, 30*c*, support ribs 54, outer ribs 58 is such that the desired amount of force is applied to the seal element 10 in the areas of the ribs 28*a*, 28*b*, 28*c*, 28*d*, 30, 30*a*, 30*b*, 30*c*, support ribs 54, outer ribs 58 to achieve the desired sealing when the seal element 10 is compressed between the outer surface of the rotor 14 and the inner surface of the housing 22. Additional outer ribs 58 may be included as part of the outer surface 56 of the outer sleeve 12*b* to provide additional support and rigidity for the seal element 10 when the seal element 10 is compressed between the outer surface of the rotor 14 and the inner surface of the housing 22. Additionally, some of the outer ribs 58 are circular to correspond to the shape of the apertures 18. In an alternate embodiment, the pattern of the outer ribs 58 of the outer sleeve 12*b* corresponds to the pattern of the ribs 28*a*, 28*b*, 28*c*, 28*d*, 30, 30*a*, 30*b*, 30*c* and support ribs 54 of the inner sleeve 12*a*, such that each support rib 54 is aligned with and supported by a corresponding one of the of outer ribs 58.

The rotor 14 is positioned such that the outer surface of the rotor 14 applies force to the ribs 28*a*, 28*b*, 28*c*, 28*d*, 30, 30*a*, 30*b*, 30*c* and support ribs 54, such that the outer ribs 58 apply force to the inner surface of the housing 22. As previously mentioned, the seal element 10 is cone-shaped when assembled, and the seal element 10 and the rotor 14 are disposed in the cavity 20 of the housing 22. The 20 cavity of the housing 22 also has a cone shape which corresponds to the cone shape of the seal element 10 when the seal element 10 is assembled, and the rotor 14 also has a cone shape which corresponds to the cone shape of the seal element 10 when the seal element 10 is assembled, such that the force applied to the seal element 10 is consistent across the height and width of the seal element 10, regardless of the orientation of the rotor 14.

The cavity 20 of the housing 22 in which the rotor 14 and the seal element 10 are located has an inner surface. The horizontal ribs 28*a*, 28*b*, 28*c*, 28*d* are in continuous contact with the outer surface of the rotor 14, and therefore there are locations of the rotor 14 where continuous force is applied by the horizontal ribs 28*a*, 28*b*, 28*c*, 28*d*, regardless of the orientation of the rotor 14. With specific reference to the horizontal ribs 28*b* in substantial alignment with the first plane 34*a* and the portion of the horizontal ribs 28*c* in alignment with the second plane 34*b*, fluid is prevented from flowing between the first level 32*a* and the second level 32*b* by the horizontal ribs 28*b*, and fluid is also prevented from flowing between the second level 32*b* and the third level 32*c* by the horizontal ribs 28*c*. Fluid is also prevented from flowing around the horizontal ribs 28*a*, 28*d* and outside of the housing 22 in an undesirable manner.

Figures 9, 10:
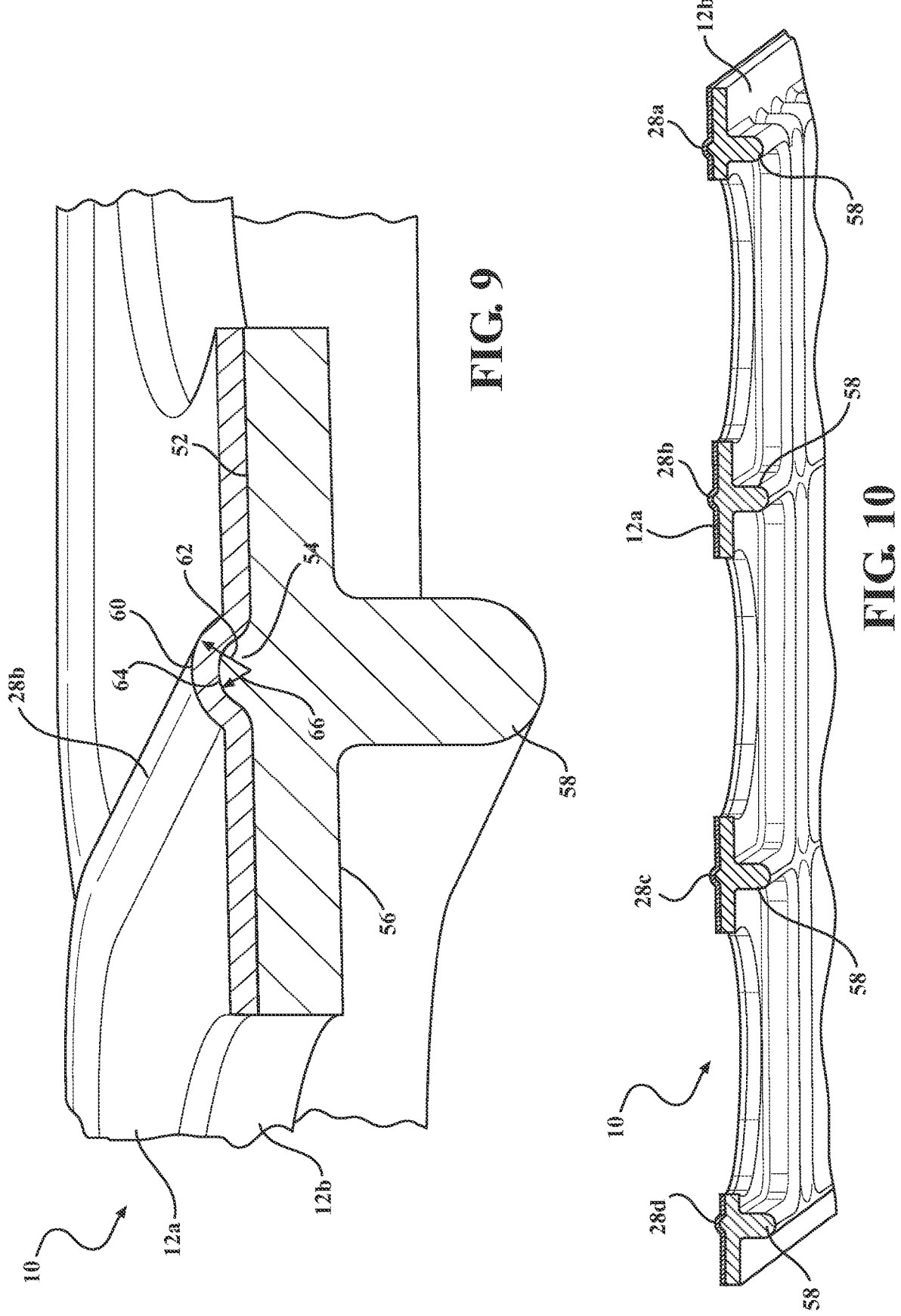
FIG. 9 is an enlarged view of a portion of FIG. 8.
FIG. 10 is a sectional view taken along lines 10-10 of FIG. 1.

The vertical ribs 30, 30*a*, 30*b*, 30*c*, the horizontal ribs 28*a*, 28*b*, 28*c*, 28*d*, and the rib portions 38*a*, 38*b*, 38*c*, 38*d* of each rib feature 36, 36a are all shaped to have a curved surface, where the curved surface has a radius. The curved surface concentrates the force applied to the outer surface of the rotor 14, which facilitates desired sealing. The curved surface also provides a gradual lead and facilitates move- ment of the edge of the channels 16 of the rotor 14 across the curved surface each of the vertical ribs 30, 30a, 30b, 30c and the rib portions 38a, 38b, 38c, 38d, reducing or eliminating the edge of one of the channels applying excessive force (reducing or eliminating torque spike) to the vertical ribs 30, 30a, 30b, 30c or the rib portions 38a, 38b, 38c, 38d during the movement of the rotor 14. Referring to FIG. 9, in a non-limiting example, one of the horizontal ribs 28b is shown, having a curved surface 60, with a radius 62. The support ribs 54 also have a corresponding curved surface 64 with a radius 66 having the same contour as the radius 62.

During operation, the rotor 14 is placed in various orien- tations such that the channels 16 of the rotor 14 direct fluid through the apertures 18 of the seal element 10 such that the fluid has various flow paths, depending upon the orientation of the rotor 14. As the orientation of the rotor 14 is changed, the horizontal ribs 28a, 28b, 28c, 28d remain in continuous contact with the outer surface of the rotor 14, regardless of the orientation of the rotor 14.

In an embodiment, the inner sleeve 12a of the seal element 10 is made of a Polytetrafluoroethylene (PTFE) material which is suitable for achieving the desired level of friction between the rotor 14 and the ribs 28a, 28b, 28c, 28d, 30, 30a, 30b, 30c, while still providing desired sealing, but it is within the scope of the invention that other materials may be used. Also, the outer sleeve 12b the seal element 10 is made of an ethylene propylene diene monomer rubber (EPDM) material, to provide the desired sealing, but it is within the scope of the invention that other materials may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
a seal assembly for a multi-port valve assembly, the seal assembly including:
a seal element, further comprising:
an inner sleeve;
an outer sleeve connected to the inner sleeve;
a plurality of apertures extending through the inner sleeve and the outer sleeve;
a plurality of vertical ribs integrally formed as part an inner surface of the inner sleeve, at least one of the plurality of vertical ribs is located between two of the plurality of apertures; and
a plurality of support ribs integrally formed as part an inner surface of the outer sleeve, one or more of the plurality of support ribs in contact with and supporting a corresponding one of the plurality of vertical ribs;
wherein one or more of the plurality of vertical ribs is in contact with an outer surface of a rotor.

2. The apparatus of claim 1, the seal element further comprising:
a plurality of outer ribs integrally formed as part of an outer surface of the outer sleeve;
wherein each of the plurality of outer ribs is in contact with an inner surface of a housing.

3. The apparatus of claim 2, wherein each of the plurality of support ribs is supported by a corresponding one of the plurality of outer ribs.

4. The apparatus of claim 1, the seal element further comprising:
a plurality of horizontal ribs integrally formed as part an inner surface of the inner sleeve, one or more of the plurality of support ribs in contact with and supporting a corresponding one of the plurality of horizontal ribs;
wherein each of the plurality of horizontal ribs is in continuous contact with the outer surface of the rotor.

5. The apparatus of claim 4, the seal element further comprising:
a first plane extending through the seal element;
a first level on one side of the first plane;
a second level on the opposite side of the first plane in relation to the first level;
a second plane extending through the seal element, the second level disposed between the first plane and the second plane; and
a third level on the opposite side of the second plane in relation to the second level;
wherein a portion of the plurality of vertical ribs is integrally formed as a part of the seal element which is located on the first level, another portion of the plurality of vertical ribs is integrally formed as a part of the seal element which is located on the second level, and another portion of the vertical ribs is integrally formed as a part of the seal element which is located on the first level.

6. The apparatus of claim 5, wherein one portion of the plurality of horizontal ribs is located in the first plane, and another portion of the plurality of horizontal ribs is located in the second plane.

7. The apparatus of claim 1, further comprising:
a first of the plurality of vertical ribs disposed between two of the plurality of apertures;
a second of the plurality of vertical ribs disposed between two of the plurality of apertures; and
at least one circumferential spacing between the first of the plurality of vertical ribs and the second of the plurality of vertical ribs;
wherein the at least one circumferential spacing decreases along the length of the first of the plurality of vertical ribs and the second of the plurality of vertical ribs.

8. The apparatus of claim 7, further comprising:
a third of the plurality of vertical ribs disposed between two of the plurality of apertures; and
a second circumferential spacing between the second of the plurality of vertical ribs and the third of the plurality of vertical ribs;
wherein the second circumferential spacing decreases along the length of the second of the plurality of vertical ribs and the third of the plurality of vertical ribs.

9. The apparatus of claim 1, further comprising:
a plurality of arcuate rib features integrally formed as part of the inner surface of the inner sleeve;
wherein each of the plurality of arcuate rib features is integrally formed with one of the plurality of vertical ribs.

10. The apparatus of claim 9, each of the plurality of arcuate rib features further comprising:
at least one rib portion; and
at least one end integrally formed with the at least one rib portion;

wherein the at least one end is integrally formed with at least one of the plurality of vertical ribs.

11. The apparatus of claim 1, each of the plurality of vertical ribs further comprising:

a curved surface having a radius;

wherein at least a portion of the curved surface is in contact with the outer surface of the rotor.

12. The apparatus of claim 1, wherein the rotor is positioned in one or more of a plurality of orientations, and one or more of the plurality of vertical ribs is in contact with the outer surface of a rotor when the rotor is placed in each of the plurality of orientations.

13. A seal assembly for a multi-port valve assembly, the seal assembly comprising:

a seal element, further comprising:

an inner sleeve;

an outer sleeve connected to the inner sleeve;

a plurality of apertures extending through the inner sleeve and the outer sleeve;

a plurality of vertical ribs integrally formed as part an inner surface of the inner sleeve, at least one of the plurality of vertical ribs is located between two of the plurality of apertures;

a plurality of horizontal ribs integrally formed as part an inner surface of the inner sleeve, each of the plurality of horizontal ribs is in continuous contact with the outer surface of a rotor; and a plurality of support ribs integrally formed as part an inner surface of the outer sleeve, each of the plurality of support ribs in contact with and supporting a corresponding one of the plurality of vertical ribs or one of the plurality of horizontal ribs;

wherein at least one of the plurality of vertical ribs and at least one of the plurality of horizontal ribs are in contact with the outer surface of the rotor.

14. The seal assembly for a multi-port valve assembly of claim 13, the seal element further comprising:

a plurality of outer ribs integrally formed as part of an outer surface of the outer sleeve;

wherein each of the plurality of outer ribs is in contact with an inner surface of a housing.

15. The seal assembly for a multi-port valve assembly of claim 14, wherein each of the plurality of support ribs is supported by a corresponding one of the plurality of outer ribs.

16. The seal assembly for a multi-port valve assembly of claim 13, the seal element further comprising:

a first plane extending through the seal element;

a first level on one side of the first plane;

a second level on the opposite side of the first plane in relation to the first level;

a second plane extending through the seal element, the second level disposed between the first plane and the second plane; and a third level on the on the opposite side of the second plane in relation to the second level;

wherein a portion of the plurality of vertical ribs is integrally formed as a part of the seal element which is located on the first level, another portion of the plurality of vertical ribs is integrally formed as a part of the seal element which is located on the second level, and another portion of the vertical ribs is integrally formed as a part of the seal element which is located on the first level.

17. The seal assembly for a multi-port valve assembly of claim 13, wherein one portion of the plurality of horizontal ribs is located in the first plane, and another portion of the plurality of horizontal ribs is located in the second plane.

18. The seal assembly for a multi-port valve assembly of claim 13, further comprising:

a first of the plurality of vertical ribs disposed between two of the plurality of apertures;

a second of the plurality of vertical ribs disposed between two of the plurality of apertures; and at first circumferential spacing between the first of the plurality of vertical ribs and the second of the plurality of vertical ribs;

a third of the plurality of vertical ribs disposed between two of the plurality of apertures; and a second circumferential spacing between the second of the plurality of vertical ribs and the third of the plurality of vertical ribs;

wherein the first circumferential spacing decreases along the length of the first of the plurality of vertical ribs and the second of the plurality of vertical ribs, and the second circumferential spacing decreases along the length of the second of the plurality of vertical ribs and the third of the plurality of vertical ribs.

19. The seal assembly for a multi-port valve assembly of claim 13, further comprising:

a plurality of arcuate rib features integrally formed as part of the inner surface of the inner sleeve;

wherein each of the plurality of arcuate rib features is integrally formed with one of the plurality of vertical ribs and one of the plurality of horizontal ribs.

20. The seal assembly for a multi-port valve assembly of claim 19, each of the plurality of arcuate rib features further comprising:

at least one rib portion; and wherein one end of the at least one rib portion is integrally formed with at least one of the plurality of vertical ribs, and another end of the at least one rib portion is integrally formed with at least one of the plurality of horizontal ribs.

21. The seal assembly for a multi-port valve assembly of claim 13, each of the plurality of horizontal ribs further comprising:

a curved surface having a radius;

wherein at least a portion of the curved surface is in contact with the outer surface of the rotor.

22. The seal assembly for a multi-port valve assembly of claim 13, each of the plurality of vertical ribs further comprising:

a curved surface having a radius;

wherein at least a portion of the curved surface is in contact with the outer surface of the rotor.

23. The seal assembly for a multi-port valve assembly of claim 13, wherein the rotor is positioned in one or more of a plurality of orientations, and one or more of the plurality of vertical ribs is in contact with the outer surface of the rotor when the rotor is placed in each of the plurality of orientations.

* * * * *